US012663977B2

(12) United States Patent
Zhou et al.

(10) Patent No.: US 12,663,977 B2
(45) Date of Patent: Jun. 23, 2026

(54) MAP UPDATE METHOD, APPARATUS, AND SYSTEM

(71) Applicant: Shenzhen Yinwang Intelligent Technologies Co., Ltd., Shenzhen (CN)

(72) Inventors: Zheng Zhou, Beijing (CN); Youlei Chen, Shenzhen (CN); Yong Wang, Shenzhen (CN); Tao Ma, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 122 days.

(21) Appl. No.: 18/237,802

(22) Filed: Aug. 24, 2023

(65) Prior Publication Data

US 2023/0401052 A1     Dec. 14, 2023

Related U.S. Application Data

(63) Continuation of application No. PCT/CN2021/133315, filed on Nov. 26, 2021.

(30) Foreign Application Priority Data

Feb. 26, 2021    (CN) ........................ 202110215706.X

(51) Int. Cl.
| *G06F 8/65* | (2018.01) |
| *G06F 16/2458* | (2019.01) |
| *G06F 16/29* | (2019.01) |

(52) U.S. Cl.
CPC ............ *G06F 8/65* (2013.01); *G06F 16/2474* (2019.01); *G06F 16/29* (2019.01)

(58) Field of Classification Search
CPC ........................................................ G06F 8/65
See application file for complete search history.

(56) References Cited

U.S. PATENT DOCUMENTS

| 2021/0157570 A1* | 5/2021 | Harata | ................... B60R 16/02 |
| 2022/0126864 A1* | 4/2022 | Moustafa | .............. B60W 40/09 |
| 2022/0170752 A1* | 6/2022 | Beaurepaire | ...... B60W 50/0205 |
| 2022/0222060 A1* | 7/2022 | Chikamori | ......... G01C 21/3881 |
| 2023/0194299 A1* | 6/2023 | Mikasa | ................... G09B 29/00 |
| | | | 701/450 |

FOREIGN PATENT DOCUMENTS

| CN | 102012232 A | 4/2011 |
| CN | 103377210 A | 10/2013 |
| CN | 105589891 A | 5/2016 |
| CN | 108769226 A | 11/2018 |

(Continued)

*Primary Examiner* — Duy Khuong T Nguyen
(74) *Attorney, Agent, or Firm* — WOMBLE BOND DICKINSON (US) LLP

(57) ABSTRACT

Receiving a map update indication message from a map server; sending a first map update query request message to an OTA upgrade master node apparatus in a vehicle based on the map update indication message; receiving a first map update query feedback message that is fed back by the OTA upgrade master node apparatus based on the first map update query request message; sending a map data download start message to the map server in response to the first map update query feedback message; receiving map update data sent by the map server; and updating a map in the vehicle based on the map update data.

10 Claims, 7 Drawing Sheets

(56) References Cited

FOREIGN PATENT DOCUMENTS

| | | | |
|---|---|---|---|
| CN | 109714727 | A | 5/2019 |
| CN | 109781122 | A | 5/2019 |
| CN | 109862084 | A | 6/2019 |
| CN | 110300406 | A | 10/2019 |
| CN | 110502599 | A | 11/2019 |
| CN | 111597283 | A | 8/2020 |
| JP | 2009250756 | A | 10/2009 |
| KR | 20090098165 | A | 9/2009 |

* cited by examiner

MAP UPDATE METHOD, APPARATUS, AND SYSTEM

CROSS-REFERENCE TO RELATED APPLICATIONS

This application is a continuation of International Application No. PCT/CN2021/133315, filed on Nov. 26, 2021, which claims priority to Chinese Patent Application No. 202110215706.X, filed on Feb. 26, 2021. The disclosures of the aforementioned applications are hereby incorporated by reference in their entireties.

TECHNICAL FIELD

This application relates to the field of intelligent driving and map technologies, and in particular, to a map update method, apparatus, and system.

BACKGROUND

With development of autonomous driving, people impose a higher requirement on computing and control capabilities of vehicles. More vehicle functions are provided in a software form, and software-defined vehicles are becoming an important development trend of vehicles. The software-defined vehicles require that software should be installed and updated conveniently on the vehicles like computers or smartphones, making the vehicles "commonly used and always new". For conventional vehicle software updates, users need to drive vehicles to automobile sales service shops or maintenance service centers, and professional technical personnel update software in the vehicles by using a dedicated vehicle. An over the air (OTA) technology provides a technical means for remotely upgrading vehicle software or repairing defects of the vehicle software. Users can use the OTA technology to connect the vehicles to a cloud side to download and install software. This greatly reduces time and space limitations on vehicle upgrade software.

As a consumer product, an automobile is presented to a user as a complex entirety. Each vehicle includes dozens or even hundreds of electronic control units (ECUs). Complex functions of the automobile need to be implemented through collaboration between a plurality of ECUs. For maintenance and upgrading of vehicles, a vehicle manufacturer mainly performs an OTA vehicle upgrade on a single vehicle. In addition, the OTA vehicle upgrade includes upgrades of a plurality of functions, including core functions and non-core functions. Generally, a plurality of ECUs are involved, and the vehicle upgrade succeeds only when all functions are successfully upgraded. Map data includes high-definition data and is also used as a vehicle upgrade part for the OTA vehicle upgrade.

Although the OTA technology makes a vehicle software upgrade more convenient, the OTA technology also causes additional risks. In the conventional technology, when an OTA upgrade is performed on a vehicle, high-definition map data and a software version of the vehicle are packaged and upgraded together. A software version upgrade period of the vehicle is long, while the high-definition map data varies with traffic environments and an upgrade period is short. As a result, packaging and upgrading the map data and the software version affects timeliness of the map data.

SUMMARY

To resolve the foregoing problem, this application provides a map update method, apparatus, and system. A map in a vehicle is separated from automobile software, and an OTA map upgrade is separately performed, to ensure timeliness of the map, and resolve problems that a procedure is complex and an upgrade period is long when the map in the vehicle and the automobile software are packaged and upgraded.

According to a first embodiment, this application provides a map update method. The method is applied to a map update apparatus in a vehicle and includes: receiving a map update indication message from a map server, where the map update indication message indicates a map update task; sending a first map update query request message to an OTA upgrade master node apparatus in the vehicle based on the map update indication message, where the first map update query request message includes related information of the map update task; receiving a first map update query feedback message that is fed back by the OTA upgrade master node apparatus based on the first map update query request message, where the first map update query feedback message includes at least one of status information or map update permission information of the vehicle; sending a map data download start message to the map server, where the map data download start message is used to trigger the map server to send map update data to the map update apparatus; receiving the map update data sent by the map server; and updating a map in the vehicle based on the map update data.

The map update apparatus may be at least one software module, may be at least one hardware entity apparatus, or may be a combination of the at least one software module and the at least one hardware entity apparatus. Likewise, the OTA upgrade master node apparatus may be at least one software module, may be at least one hardware entity apparatus, or may be a combination of the at least one software module and the at least one hardware entity apparatus. The map server may be an independent server that has map data storage and transmission functions, or may be a set of a plurality of discrete servers that implement map data storage and transmission functions through cooperative work.

In the solution described in this application, a map update is separated from a software update of the vehicle. When a map version changes, an OTA upgrade is separately performed on the map in the vehicle, so that a map update procedure is simplified. In addition, in comparison with the conventional technology in which the map and automobile software are synchronously and simultaneously updated, in this application, a map update period is shortened, timeliness of the map is improved, and user experience is improved.

In a possible implementation, before the sending a map data download start message to the map server, the method further includes: determining, based on the first map update query feedback message, that a map update is capable of being performed in the vehicle.

In a possible implementation, the status information of the vehicle includes at least one of a status of an intelligent driving function of the vehicle or a status of the map in the vehicle.

In the solution described in this application, it is determined, based on the first map update query feedback message fed back by the OTA upgrade master node apparatus, for example, the status of the intelligent driving function of the vehicle, that the map update is capable of being performed in the vehicle, to avoid a fault caused by a map upgrade when the vehicle cannot be upgraded and avoid affecting use of a user. This improves user experience.

In a possible implementation, after the updating a map in the vehicle based on the map update data, the method further includes: generating a map update log of the vehicle, and sending the map update log to the map server, where the map update log may include at least one of update time of the map in the vehicle, the status information of the vehicle, an update result of the map in the vehicle, or a version number of the map in the vehicle, and the update result includes an update success or an update failure.

In the solution described in this application, the map update log is sent to the map server, and the map server may be notified of the update result of the vehicle, to update a task status of the vehicle. In addition, when the update succeeds, the map server may be prevented from repeatedly delivering the update task to the vehicle. Moreover, when the update fails, the map server may further repeatedly deliver the update task to the vehicle.

According to a second embodiment, this application further provides a map update method. The method is applied to an OTA upgrade master node apparatus in a vehicle and includes: receiving a first map update query request message from a map update apparatus in the vehicle, where the first map update query request message includes related information of a map update task; and sending a first map update query feedback message to the map update apparatus based on the first map update query request message, where the first map update query feedback message includes at least one of status information or map update permission information of the vehicle, and the map update query feedback message is used to trigger the map update apparatus to update a map in the vehicle.

In a possible implementation, before the sending a first map update query feedback message, the method further includes: sending a second map update query request message to a user; receiving a second map update query feedback message fed back by the user; and generating the first map update query feedback message based on the second map update query feedback message.

In a possible implementation, before the sending a first map update query feedback message, the method further includes: sending a third map update query request message to a vehicle upgrade server; receiving a third map update query feedback message fed back by the vehicle upgrade server; and generating the first map update query feedback message based on the third map update query feedback message.

In the solution described in this application, the OTA upgrade master node apparatus performs query on the user or the vehicle upgrade server to obtain map update permission from the user and the vehicle upgrade server, and performs an update after obtaining the permission. This can improve user experience.

According to a third embodiment, this application further provides a map update method. The method is applied to a map update apparatus in a vehicle and includes: receiving a map update notification message from an OTA upgrade master node apparatus in the vehicle; downloading map update data from a map server based on the map update notification message; sending a map data download complete message to the OTA upgrade master node apparatus, where the map data download complete message indicates that the map update apparatus has completed downloading of the map update data; receiving a map data update start message from the OTA upgrade master node apparatus; and in response to the map data update start message, updating a map in the vehicle by using the downloaded map update data.

In a possible implementation, the downloading map update data from a map server based on the map update notification message includes: establishing a connection to the map server based on the map update notification message; sending a map data download start message to the map server, where the map data download start message is used to trigger the map server to send the map update data to the map update apparatus; and receiving the map update data sent by the map server.

In a possible implementation, the map update notification message includes an address of the map server or a download address of the map update data.

In a possible implementation, after the updating a map in the vehicle by using the downloaded map update data, the method in the third embodiment further includes: generating a map update log of the vehicle, and sending the map update log to at least one of the map server or the OTA upgrade master node apparatus, where the map update log may include at least one of update time of the map in the vehicle, status information of the vehicle, an update result of the map in the vehicle, or a version number of the map in the vehicle, and the update result includes an update success or an update failure.

In the solution described in this application, map data is separated from automobile software data, so that procedures for packaging and splitting the map data and the software data are avoided. This reduces map update complexity, shortens a time for updating the map, and improves user experience.

According to a fourth embodiment, this application further provides a map update method. The method is applied to an OTA upgrade master node apparatus in a vehicle and includes: receiving a vehicle upgrade indication message from a vehicle upgrade server, where the vehicle upgrade indication message includes map update related information; sending a map update notification message to a map update apparatus in the vehicle based on the map update related information, where the map update notification message is used to trigger the map update apparatus to download map update data from a map server; receiving a map data download complete message from the map update apparatus, where the map data download complete message indicates that the map update apparatus has completed downloading of the map update data; and sending a map data update start message to the map update apparatus, where the map data update start message is used to trigger the map update apparatus to update a map in the vehicle by using the downloaded map update data.

The vehicle upgrade server may be an independent server that has OTA upgrade data storage and transmission functions, or may be a set of a plurality of discrete servers that implement OTA upgrade data storage and transmission functions through cooperative work.

In a possible implementation, the map update notification message includes an address of the map server or a download address of the map update data.

According to a fifth embodiment, this application further provides a map update apparatus. The map update apparatus is applied to a map update apparatus in a vehicle and includes: a first receiving module, configured to receive a map update indication message from a map server, where the map update indication message indicates a map update task; a query module, configured to send a first map update query request message to an OTA upgrade master node apparatus in the vehicle based on the map update indication message, where the first map update query request message includes related information of the map update task; the first receiving module is further configured to receive a first map update query feedback message that is fed back by the OTA upgrade master node apparatus based on the first map update query request message, where the first map update query feedback message includes at least one of status information or map update permission information of the vehicle; a first downloading module, configured to send a map data download start message to the map server, where the map data download start message is used to trigger the map server to send map update data to the map update apparatus; the first receiving module is further configured to receive the map update data sent by the map server; and a first update module, configured to update a map in the vehicle based on the map update data.

In a possible implementation, the map update apparatus further includes a determining module, configured to determine, based on the first map update query feedback message, that a map update is capable of being performed in the vehicle.

In a possible implementation, the status information of the vehicle includes at least one of a status of an intelligent driving function of the vehicle or a status of the map in the vehicle.

In a possible implementation, the map update apparatus further includes a first log module, configured to: generate a map update log of the vehicle, and send the map update log to the map server.

According to a sixth embodiment, this application further provides a map update apparatus. The map update apparatus is applied to an OTA upgrade master node apparatus in a vehicle and includes: a second receiving module, configured to receive a first map update query request message from the map update apparatus in the vehicle, where the first map update query request message includes related information of a map update task; and a first sending module, configured to send a first map update query feedback message to the map update apparatus based on the first map update query request message, where the first map update query feedback message includes at least one of status information or map update permission information of the vehicle.

In a possible implementation, the map update apparatus further includes a first query module, configured to: send a second map update query request message to a user; receive a second map update query feedback message fed back by the user; and generate the first map update query feedback message based on the second map update query feedback message.

In a possible implementation, the map update apparatus further includes the first query module, configured to: send a third map update query request message to a vehicle upgrade server; receive a third map update query feedback message fed back by the vehicle upgrade server; and generate the first map update query feedback message based on the third map update query feedback message.

According to a seventh embodiment, an embodiment of this application further provides a map update apparatus. The map update apparatus is applied to a map update apparatus in a vehicle and includes: a third receiving module, configured to receive a map update notification message from an OTA upgrade master node apparatus in the vehicle; a second downloading module, configured to download map update data from a map server based on the map update notification message; a second sending module, configured to send a map data download complete message to the OTA upgrade master node apparatus, where the map data download complete message indicates that the map update apparatus has completed downloading of the map update data; the third receiving module is further configured to receive a map data update start message from the OTA upgrade master node apparatus; and a second update module, configured to: in response to the map data update start message, update a map in the vehicle by using the downloaded map update data.

In a possible implementation, the second downloading module is configured to: establish a connection to the map server based on the map update notification message; send a map data download start message to the map server, where the map data download start message is used to trigger the map server to send the map update data to the map update apparatus; and receive the map update data sent by the map server.

In a possible implementation, the map update notification message includes an address of the map server or a download address of the map update data.

In a possible implementation, the map update apparatus further includes a second log module, configured to: generate a map update log of the vehicle, and send the map update log to at least one of the map server or the OTA upgrade master node apparatus.

According to an eighth embodiment, this application further provides a map update apparatus. The map update apparatus is applied to an OTA upgrade master node apparatus in a vehicle and includes: a fourth receiving module, configured to receive a vehicle upgrade indication message from a vehicle upgrade server, where the vehicle upgrade indication message includes map update related information; and a third sending module, configured to send a map update notification message to the map update apparatus in the vehicle based on the map update related information, where the map update notification message is used to trigger the map update apparatus to download map update data from a map server; where the fourth receiving module is further configured to receive a map data download complete message from the map update apparatus, where the map data download complete message indicates that the map update apparatus has completed downloading of the map update data; and the third sending module is further configured to send a map data update start message to the map update apparatus, where the map data update start message is used to trigger the map update apparatus to update a map in the vehicle by using the downloaded map update data.

In a possible implementation, the map update notification message includes an address of the map server or a download address of the map update data.

According to a ninth embodiment, this application further provides a map update system, including a map update apparatus and an OTA upgrade master node apparatus. The map update apparatus is configured to perform the method in the first embodiment and the possible implementations of the first embodiment, and the OTA upgrade master node apparatus is configured to perform the method in the second embodiment and the possible implementations of the second embodiment.

According to a tenth embodiment, this application further provides a map update system, including a map update apparatus and a map server. The map update apparatus is configured to perform the method in the first embodiment and the possible implementations of the first embodiment. The map server is configured to send a map update indication message and map update data to the map update apparatus.

According to an eleventh embodiment, this application further provides a map update system, including a map update apparatus and an OTA upgrade master node apparatus. The map update apparatus is configured to perform the method in the third embodiment and the possible implementations of the third embodiment, and the OTA upgrade master node apparatus is configured to perform the method in the fourth embodiment and the possible implementations of the fourth embodiment.

According to a twelfth embodiment, this application further provides a map update system, including a map update apparatus and a map server. The map update apparatus is configured to perform the method in the third embodiment and the possible implementations of the third embodiment. The map server is configured to send map update data to the map update apparatus.

According to a thirteenth embodiment, this application further provides a map update apparatus, including a memory and a processor. The memory is configured to store computer instructions, and the processor executes the computer instructions stored in the memory, to perform the method in the first embodiment and the possible implementations of the first embodiment, perform the method in the second embodiment and the possible implementations of the second embodiment, perform the method in the third embodiment and the possible implementations of the third embodiment, or perform the method in the fourth embodiment and the possible implementations of the fourth embodiment.

According to a fourteenth embodiment, this application further provides a computer-readable storage medium. The computer-readable storage medium stores computer program code, and when the computer program code is executed by a map update apparatus, the map update apparatus performs the method in the first embodiment and the possible implementations of the first embodiment, performs the method in the second embodiment and the possible implementations of the second embodiment, performs the method in the third embodiment and the possible implementations of the third embodiment, or performs the method in the fourth embodiment and the possible implementations of the fourth embodiment.

According to a fifteenth embodiment, this application further provides a computer program product. When the computer program product runs on a map update apparatus, the map update apparatus is enabled to perform the method in the first embodiment and the possible implementations of the first embodiment, perform the method in the second embodiment and the possible implementations of the second embodiment, perform the method in the third embodiment and the possible implementations of the third embodiment, or perform the method in the fourth embodiment and the possible implementations of the fourth embodiment.

Any apparatus, computer storage medium, or computer program product provided above is configured to perform the methods provided above. Therefore, for beneficial effects thereof, refer to the beneficial effects of the corresponding solutions in the corresponding methods provided above. Details are not described herein again.

DESCRIPTION OF EMBODIMENTS

To make objectives, technical solutions, and advantages of embodiments of this application clearer, the following describes technical solutions in embodiments of this application with reference to the accompanying drawings.

In descriptions of embodiments of this application, a term "example", "for example", "for instance", or the like is used to represent giving an example, an illustration, or a description. Any embodiment or design scheme described as "example", "for example", or "for instance" in embodiments of this application should not be construed as being preferred or having more advantages over other embodiments or design schemes. Exactly, use of the term "example", "for example", "for instance", or the like is intended to present a related concept in a manner.

In the descriptions of embodiments of this application, a term "and/or" describes only an association relationship for describing associated objects and represents that three relationships may exist. For example, A and/or B may represent the following three cases: Only A exists, only B exists, and both A and B exist. In addition, unless otherwise specified, a term "a plurality of" means at least two. For example, a plurality of systems means at least two systems, and a plurality of screen terminals means at least two screen terminals. "At least one of the following items (pieces)" or a similar expression thereof means any combination of these items, including a singular item (piece) or any combination of plural items (pieces). For example, at least one item (piece) of a, b, or c may represent a; b; c; a and b; a and c; b and c; or a, b, and c, where a, b, and c each may be in a singular or plural form.

In addition, the terms "first" and "second" are merely intended for a purpose of description, and shall not be understood as an indication or implication of relative importance or implicit indication of an indicated technical feature. Therefore, features modified by "first" and "second" may explicitly indicate or implicitly include one or more such features. Terms "include", "comprise", "have", and variants thereof all mean "including but not limited to", unless otherwise specified particularly.

Figure 1:
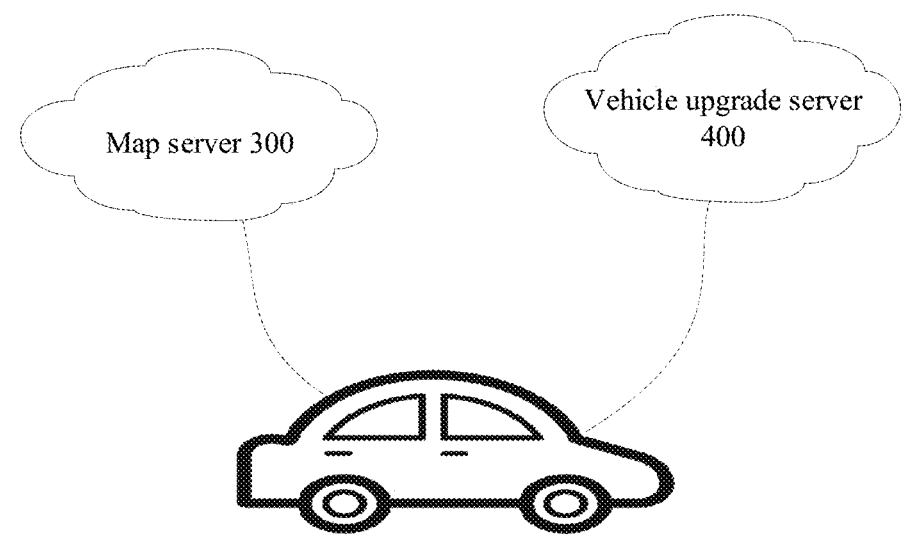
FIG. 1 is a diagram of a scenario of performing an OTA map upgrade on a vehicle according to this application.

FIG. 1 is a schematic diagram of a scenario of performing an OTA map upgrade on a vehicle according to an embodiment of this application. As shown in FIG. 1, in the scenario, a vehicle and a server that is located in a cloud side and that communicates with the vehicle are included. A map update apparatus 100 and an OTA upgrade master node apparatus 200 are deployed in the vehicle, and a cloud-side server includes a map server 300 and a vehicle upgrade server 400.

The map server 300 is configured to store and transmit map data provided by a map provider for the vehicle, and the vehicle upgrade server 400 is configured to store and transmit a variety of software data of the vehicle. The software data includes the map data of the vehicle and other data of the vehicle.

The map update apparatus 100 is a map upgrade client provided by the map provider, is an electronic control unit (ECU) playing a slave role in the vehicle, and is responsible for updating a map in the vehicle. The OTA upgrade master node apparatus 200 is a software upgrade client deployed by a vehicle manufacturer in the vehicle, is an electronic control unit playing a master role in the vehicle, and is responsible for a vehicle software upgrade of the vehicle. The OTA upgrade master node apparatus 200 may be any one of automobile control centers such as an intelligent driving computing platform (a mobile data center in an automobile, mobile data center, MDC) and an in-vehicle system T-Box. The map update apparatus 100 communicates with both the map server 300 and the OTA upgrade master node apparatus 200. Correspondingly, the map update apparatus 100 may receive a map update indication message from the map server 300, and may also receive a map update notification message from the OTA upgrade master node apparatus 200, to upgrade and update the map in the vehicle to which the map update apparatus 100 belongs. The vehicle may communicate with the server by using any one of a digital mobile communications technology, a wireless local area network communications technology, or an artificial satellite communications technology. The digital mobile communications technology may be one of a second generation digital mobile communications technology (2G), a third generation digital mobile communications technology (3G), a fourth generation digital mobile communications technology (4G), a fifth generation digital mobile communications technology (5G), and the like. The 2G mobile communications technology may be one of a GSM communications technology or a CDMA communications technology. The 3G mobile communications technology may be one of a WCDMA communications technology, a CDMA2000 communications technology, or a TD-SCDMA communications technology. The 4G mobile communications technology may be one of an LTE-FDD communications technology or LTE-TDD. The wireless local area network communications technology may be any generation of wireless network technologies, for example, Wi-Fi 5, Wi-Fi 6, or Wi-Fi 6+.

Figure 2:
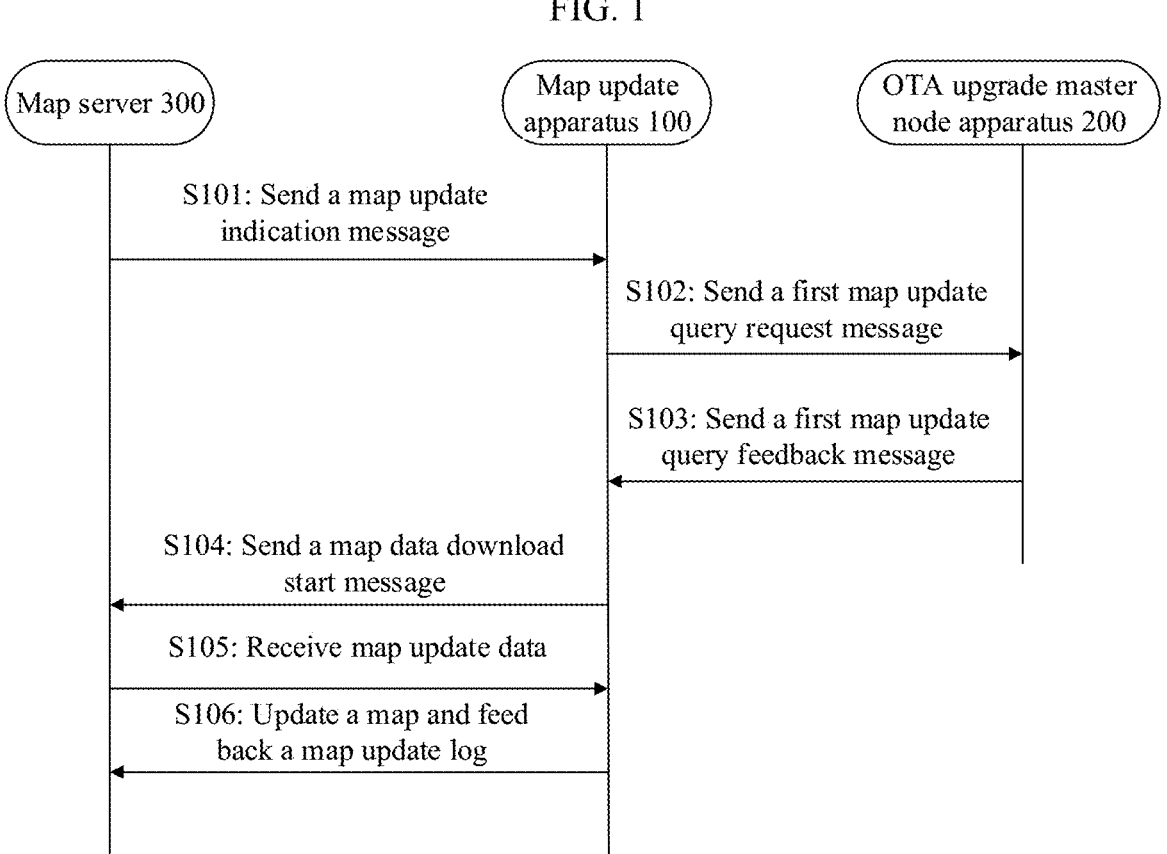
FIG. 2 is a flowchart of a map update method according to an embodiment of this application.

Based on the foregoing scenario of performing the OTA map upgrade on the vehicle, an embodiment of this application provides a map update method. As shown in FIG. 2, the method includes the following operation S101 to operation S106.

Operation S01: A map server 300 sends a map update indication message to a map update apparatus 100.

In this embodiment, when detecting that stored map data changes, the map server 300 generates map update data and the map update indication message, obtains a vehicle list from a vehicle upgrade server 400, and then sends the map update indication message to a vehicle in the vehicle list after a communications connection is established between the vehicle in the vehicle list and the map server 300. The map update indication message indicates a map update task.

For example, when obtaining the vehicle list, the map server 300 may send a vehicle list query request message to the vehicle upgrade server 400, where the vehicle list query request message includes related information of the map update data. When receiving the vehicle list query request message, the vehicle upgrade server 400 sends the vehicle list corresponding to the map update data to the map server 300. In some embodiments, the related information of the map update data may include a version number of the map update data. The vehicle upgrade server 400 may determine, based on the version number of the map update data, the vehicle that is using this map, to generate the vehicle list corresponding to the map update data.

In some embodiments, before sending the map update indication message, based on information in the vehicle list, the map server 300 may determine the vehicle in which the current map update data can be updated, and formulate map update time for each vehicle; and send the map update indication message to each vehicle based on the formulated time. The information in the vehicle list may include one or more of an ID of each vehicle, a map payment status of each vehicle, a software version of each vehicle, a map update priority of each vehicle, and a map update planning time specified for each vehicle. For example, when a map payment status of a vehicle is an unpaid state, the vehicle has no permission to upgrade current map update data; or when a software version of a vehicle is incompatible with a version of the map update data, the vehicle has no permission to upgrade current map update data.

Operation S102: The map update apparatus 100 receives the map update indication message from the map server 300, and sends a first map update query request to an OTA upgrade master node apparatus 200 in the vehicle based on the map update indication message.

In this embodiment, when receiving the map update indication message, the map update apparatus 100 generates the first map update query request message based on the map update indication message, and sends the first map update query request message to the OTA upgrade master node apparatus 200. The first map update query request may include related information of the map update task, and the related information of the map update task may include the version number of the map update data.

Operation S103: The OTA upgrade master node apparatus 200 receives the first map update query request message, generates a first map update query feedback message based on the first map update query request message, and sends the first map update query feedback message to the map update apparatus 300.

In this embodiment, the first map update query feedback message includes at least one of status information or map update permission information of the vehicle. After receiving the first map update query request message, the OTA upgrade master node apparatus 200 queries for the at least one of the status information of the vehicle or the map update permission information of the vehicle, and generates the first map update query feedback message based on the obtained status information and the obtained map update permission information of the vehicle. For example, the status information of the vehicle may include at least one of a status of an intelligent driving function of the vehicle or a status of the map in the vehicle.

Figure 3:
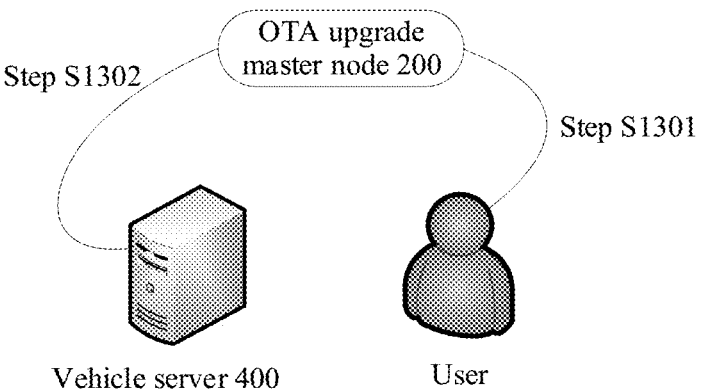
FIG. 3 is a diagram of generating a first map update query feedback message by an OTA upgrade master node apparatus according to an embodiment of this application.

In some embodiments, after receiving the first map update query request message, the OTA upgrade master node apparatus 200 may further generate the first map update query feedback message by using operation S1031 or operation S1032 shown in FIG. 3.

In operation S1031, the OTA upgrade master node apparatus 200 may generate a second map update query request message based on the first map update query request message, send the second map update query request message to a user, and then generate the first map update query feedback message based on a second map update query feedback message fed back by the user. In a possible implementation, the OTA upgrade master node apparatus 200 sends the second map update query request message to a terminal module deployed in the vehicle. A human machine interface (HMI) or a user interface is disposed in the terminal module, and is configured to: present the second map update query request message to the user, collect the second map update query feedback message fed back by the user, and send the second map update query feedback message to the OTA upgrade master node apparatus 200.

In some embodiments, the terminal module may be a voice module, including a microphone and an audio player. The voice module presents the second map update query request message to the user in a voice form by using the audio player, receives, by using the microphone, the second map update query feedback message fed back by the user, and sends the second map update query feedback message to the OTA upgrade master node apparatus 200.

The terminal module may be alternatively a display module, including a display component and an input component. The display module may present the second map update query request message to the user in an interface form by using the display component, receive, by using the input component, the second map update query feedback message fed back by the user, and send the second map update query feedback message to the OTA upgrade master node apparatus 200. The input component may be a touch component or a button component.

In operation S1032, the OTA upgrade master node apparatus 200 may alternatively generate a third map update query request message based on the first map update query request message, send the third map update query request message to the vehicle upgrade server 400, and then generate the first map update query feedback message based on a third map update query feedback message fed back by the vehicle upgrade server 400.

Operation S104: The map update apparatus 100 determines, based on the first map update query feedback message fed back by the OTA upgrade master node apparatus 200, that a map update is capable of being performed in the vehicle, and then sends a map data download start message to the map server 300.

In this embodiment, the map update apparatus 100 performs determining on the obtained first map update query feedback message based on a preset update condition. When the first map update query feedback message satisfies the update condition, the map update apparatus 100 can determine that the map update apparatus 100 can perform the map update in the vehicle. After determining that the map update can be performed in the vehicle, the map update apparatus 100 generates the map data download start message and sends the map data download start message to the map server 300. The update condition matches the first map update query feedback message. When the first map update query feedback message includes the status of the intelligent driving function of the vehicle or the status of the map in the vehicle, the update condition includes that the intelligent driving function of the vehicle is disabled or the map in the vehicle is not being used.

Operation S105: After receiving the map data download start message, the map server 300 sends the map update data to the map update apparatus 100, and the map update apparatus 100 receives the map update data and completes downloading of the map data.

In this embodiment, the map server 300 transmits the map update data to the map update apparatus 100 by using a file transfer protocol (FTP), and may further improve a transmission speed of the map update data by using a content delivery network (CDN) technology. The map server 300 divides a data packet of the to-be-downloaded map update data into several parts, and each part is transmitted by using one thread. When the map update apparatus 100 downloads the map update data, if the downloading is interrupted due to an accident, for example, a network fault, the map update apparatus 100 may continue to download the map update data from an interrupted data location, and does not need to start downloading from the beginning. This improves user experience. In some embodiments, the data packet of the map update data may be a full package or may be a differential package. The full package includes complete data of the map, and the differential package includes a to-be-updated data part of the map in the vehicle. In this embodiment, when the differential packet is transmitted by using the file transfer protocol, a download time of the map upgrade client can be reduced to the greatest extent, and costs of downloading the map update data can also be reduced for the user.

Operation S106: The map update apparatus 100 updates the map in the vehicle based on the map update data, generates a map update log, and sends the map update log to the map server 300.

In this embodiment, the map update apparatus 100 may update, by using the map update data, the installed map in the vehicle after downloading of the map update data is completed; and may further send a download complete message and an update time list to the user after downloading of the map update data is completed, wait for the user to feed back selected update time, and then update the map based on the update time selected by the user. The map update apparatus 100 generates the map update log after the map update ends, to record related information of this map update, and sends the map update log to the map server 300, so that the map server 300 updates a task status of the vehicle based on the map update log. The map update log may include at least one of the update time of the map in the vehicle, the status information of the vehicle, an update result of the map in the vehicle, or a version number of the map in the vehicle, and the update result includes an update success or an update failure. In addition, the map update apparatus 100 may update the map by using a backup mechanism. When the map update fails, the map update apparatus 100 may roll back the map in the vehicle to an original version, to avoid that an automobile function is unavailable due to an upgrade failure, thereby improving user experience.

In this embodiment of this application, the map update of the vehicle is separated from a software update of the vehicle, and an OTA upgrade is separately performed on the map in the vehicle when there is a new version for the map. This avoids that a long upgrade period of vehicle software affects timeliness of the map update data, so that the user can use the map of a latest version in time.

Based on the foregoing map update method embodiment, an embodiment of this application provides a map update apparatus 100. The map update apparatus 100 may be implemented by at least one software apparatus, may be implemented by at least one hardware entity device, or may be implemented by a combination of a software apparatus and a hardware entity device.

Figure 4:
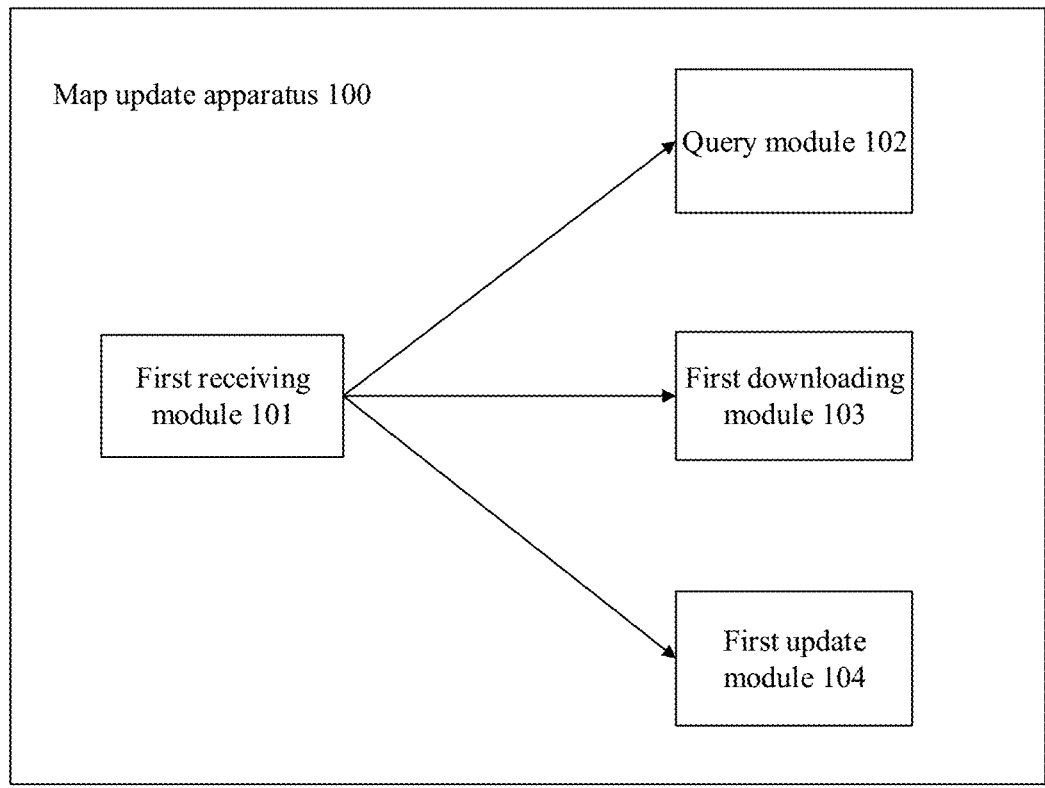
FIG. 4 is a diagram of a functional structure of a map update apparatus according to an embodiment of this application.

When the map update apparatus 100 is a software apparatus, the map update apparatus 100 may be logically divided into a plurality of modules, each module may have a different function, and the function of each module is implemented by a processor in the map update apparatus by reading and executing instructions in a memory. FIG. 4 is a schematic diagram of a structure of a map update apparatus 100 according to an embodiment of this application. As shown in FIG. 4, the map update apparatus 100 includes a first receiving module 101, a query module 102, a first downloading module 103, and a first update module 104. It should be noted that in this embodiment of this application, only example division is performed on the structure and the functional modules of the map update apparatus 100, but division thereof is not limited.

In this embodiment, the first receiving module 101 is configured to receive a map update indication message from a map server 300; the query module 102 is configured to send a first map update query request message to an OTA upgrade master node apparatus in a vehicle based on the map update indication message, where the first map update query request message includes related information of a map update task, and the first map update query request message is used to obtain upgrade permission from the OTA upgrade master node apparatus; the first receiving module 101 is further configured to receive a first map update query feedback message that is fed back by the OTA upgrade master node apparatus based on the first map update query request message, where the first map update query feedback message includes at least one of status information or map update permission information of the vehicle; the first downloading module 103 is configured to send a map data download start message to the map server 300 in response to the map update query feedback message, where the map data download start message is used to trigger the map server 300 to send map update data to the map update apparatus; the first receiving module 101 is further configured to receive the map update data sent by the map server 300; and the first update module 104 is configured to update a map in the vehicle based on the received map update data.

In addition, the map update apparatus 100 may further include: a determining module 105, configured to determine, based on the map update query feedback message, that a map update is capable of being performed in the vehicle; and a first log module 106, configured to: generate a map update log of the vehicle, and send the map update log to the map server 300. The map update log is used by the map server 300 to update a status of the map update task of the vehicle. When receiving the map update log of the vehicle, the map server 300 updates the status of the map update task of the vehicle based on information in the map update log.

Moreover, in some possible cases, some of the plurality of modules included in the map update apparatus 100 may be alternatively combined into one module. For example, the first update module 104 and the first log module 106 may be combined into one module, that is, the combined module integrates functions of the first update module 104 and the first log module 106.

Figure 5:
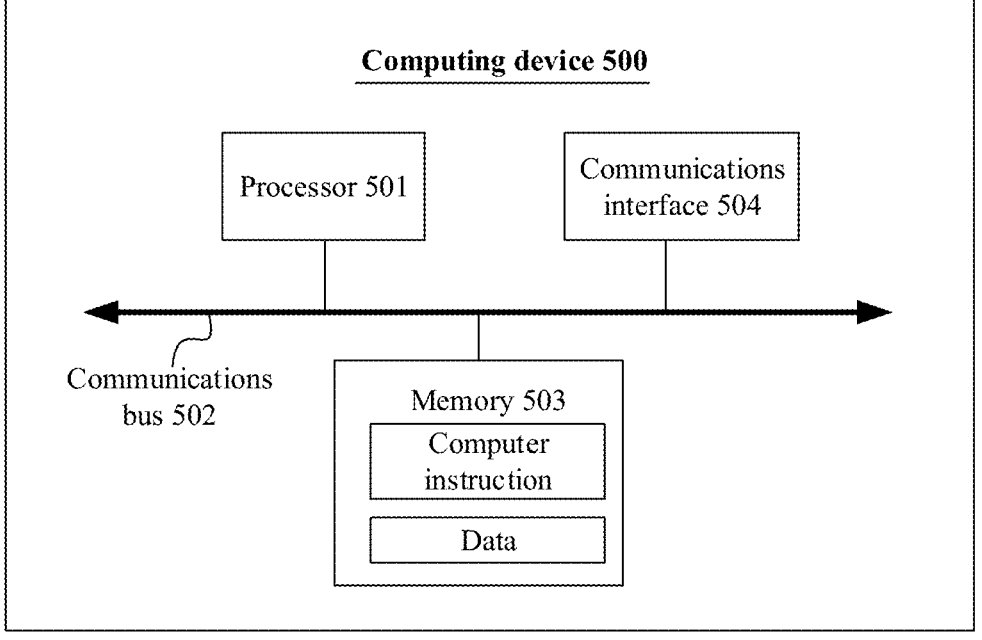
FIG. 5 is a diagram of a functional structure of a map update apparatus according to an embodiment of this application.

When the map update apparatus 100 is a hardware device, the map update apparatus 100 may be any map update apparatus in a vehicle. FIG. 5 is a schematic diagram of a structure of a map update apparatus 500 according to an embodiment of this application. As shown in FIG. 5, the map update apparatus 500 includes a processor 501, a communications bus 502, a memory 503, and at least one communications interface 504.

The processor 501 may be a general-purpose central processing unit (CPU), an application-specific integrated circuit (ASIC), a graphics processing unit (GPU), or any combination thereof. The processor 501 may include one or more chips. The processor 501 may include an AI accelerator, for example, a neural network processing unit (NPU).

The communications bus 502 may include a path on which information is transmitted between the components (for example, the processor 501, the memory 503, and the communications interface 504) of the map update apparatus 500.

The memory 503 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), other optical disk storage, optical disc storage (including a compact disc, a laser disc, an optical disc, a digital versatile disc, a Blu-ray disc, or the like), a magnetic disk storage medium, another magnetic storage device, or any other medium that can be used to carry or store expected program code in a form of instructions or a data structure and that is accessible to a computer. However, no limitation is imposed thereto. The memory 503 may exist independently, and is connected to the processor 501 through the communications bus 502. Alternatively, the memory 503 may be integrated with the processor 501. The memory 503 may store computer instructions. When the computer instructions stored in the memory 503 are executed by the processor 501, a model optimization method in this application may be implemented. In addition, the memory 503 may further store data needed by the processor and intermediate data and/or result data generated by the processor in a process of performing the foregoing method.

The communications interface 504 uses any transceiver-type apparatus, and is configured to communicate with another device or a communications network, for example, an Ethernet, a radio access network (RAN), or a wireless local area network (WLAN).

In a possible implementation, the processor 501 may include one or more CPUs.

In a possible implementation, in an embodiment, a computer device may include a plurality of processors. Each of the processors may be a single-core processor (single-CPU), or may be a multi-core processor (multi-CPU). The processor herein may be one or more devices, circuits, and/or processing cores configured to process data (for example, computer program instructions).

Based on the foregoing map update method embodiment, an embodiment of this application further provides an OTA upgrade master node apparatus 200. Likewise, the OTA upgrade master node apparatus 200 may be implemented by at least one software apparatus, may be implemented by at least one hardware entity device, or may be implemented by a combination of a software apparatus and a hardware entity device.

Figure 6:
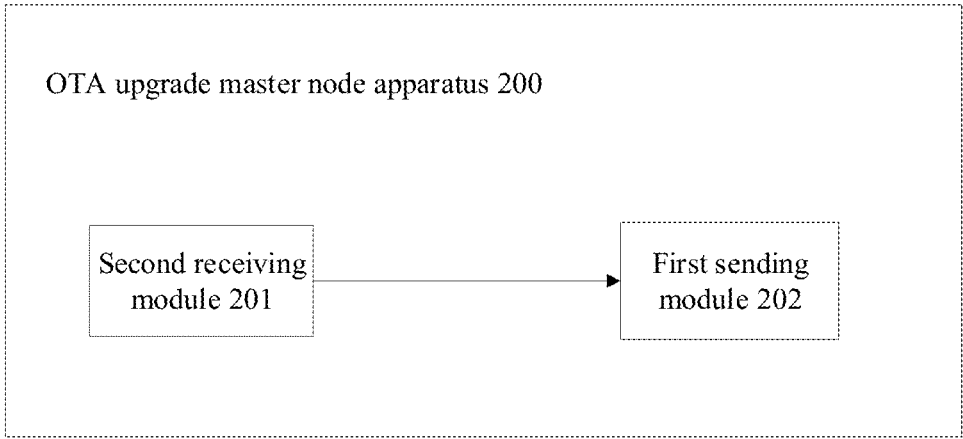
FIG. 6 is a diagram of a functional structure of an OTA upgrade master node apparatus according to an embodiment of this application.

When the OTA upgrade master node apparatus 200 is a software apparatus, a map update apparatus 100 may be logically divided into a plurality of modules, each module may have a different function, and the function of each module is implemented by a processor in the map update apparatus by reading and executing instructions in a memory. FIG. 6 is a schematic diagram of a structure of an OTA upgrade master node apparatus 200 according to an embodiment of this application. As shown in FIG. 6, the OTA upgrade master node apparatus 200 includes a second receiving module 201 and a first sending module 202. In this embodiment of this application, only example division is performed on the structure and the functional modules of the OTA upgrade master node apparatus 200, but division thereof is not limited.

In this embodiment, the second receiving module 201 is configured to receive a first map update query request message from the map update apparatus 100 in a vehicle, where the first map update query request message includes related information of a map update task; and the first sending module 202 is configured to send a first map update query feedback message to the map update apparatus 100 based on the first map update query request message, where the first map update query feedback message includes at least one of status information or map update permission information of the vehicle.

In addition, the OTA upgrade master node apparatus 200 further includes a first query module 203 and a second query module 204. The first query module 203 is configured to: send a second map update query request message to a user, receive a second map update query feedback message fed back by the user, and generate the first map update query feedback message based on the second map update query feedback message. The second query module 204 is configured to: send a third map update query request message to a vehicle upgrade server, receive a third map update query feedback message fed back by the vehicle upgrade server, and generate the first map update query feedback message based on the third map update query feedback message.

When the OTA upgrade master node apparatus 200 is a hardware device, the OTA upgrade master node apparatus 200 may be any map update apparatus in a vehicle. In a possible implementation, the structure of the map update apparatus may be the structure of the map update apparatus shown in FIG. 5. Details are not described herein again.

Figure 7A:
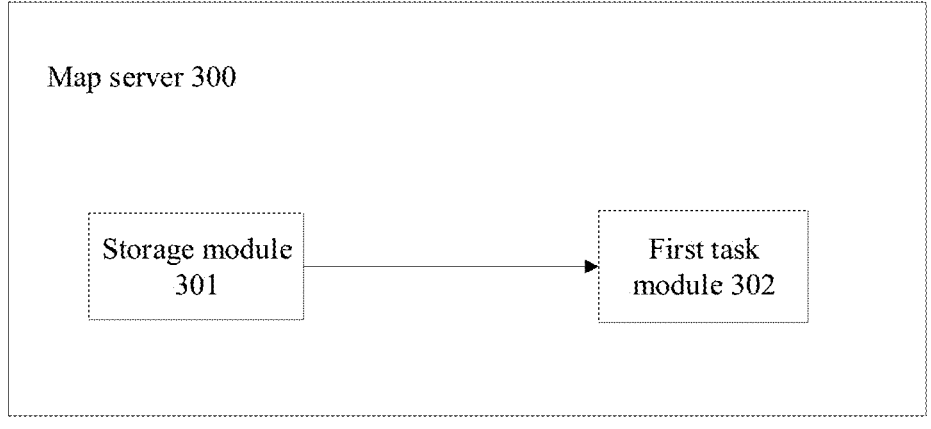
FIG. 7*a* is a diagram of a functional structure of a map server according to an embodiment of this application.

Based on the foregoing map update method embodiment, this application further provides a map server 300. The map server 300 may be deployed in a cloud data center by a map service provider. As shown in FIG. 7a, the map server 300 may include a storage module 301 and a first task module 302. The storage module 301 is configured to store map data. The first task module 302 is configured to: determine whether the map data stored in the storage module 301 changes; and when the map data changes, generate a map update indication message, obtain a vehicle list from a vehicle upgrade server 400, determine whether a map update is capable of being performed in a vehicle in the vehicle list, and send the map update indication message to the vehicle in which the map update is capable of being performed. The first task module 302 is further configured to: when receiving a map data download start message of the vehicle, obtain map update data from the storage module 301, and send the map update data to the vehicle.

Figure 7B:
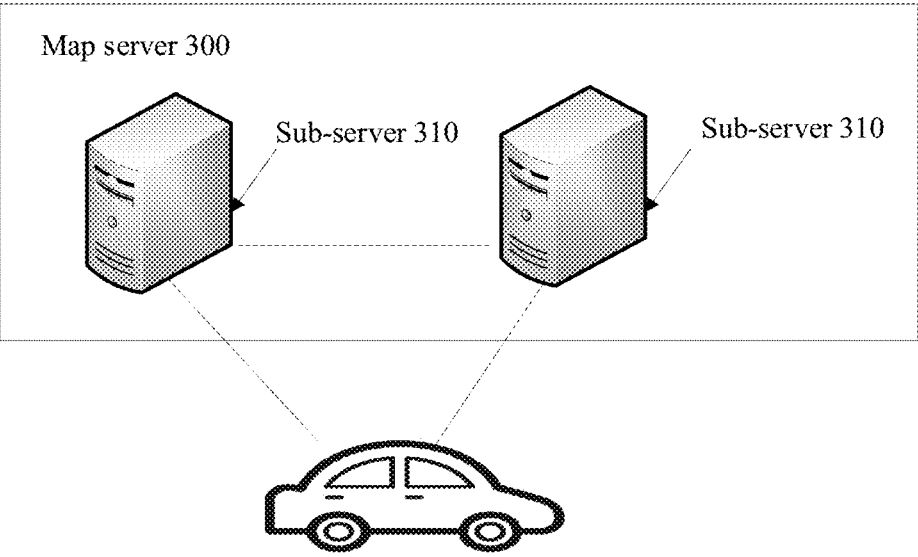
FIG. 7*b* is a diagram of a deployment structure of a map server according to an embodiment of this application.

In some embodiments, the map server 300 may be an independent server that has map data storage and transmission functions. The map server 300 communicates with the vehicle, and provides the map update for the vehicle. Alternatively, the map server 300 may be a set of a plurality of discrete servers that implement map data storage and transmission functions through cooperative work. As shown in FIG. 7b, functional modules of the map server 300 may be deployed in a plurality of sub-servers 310 in a distributed manner. Each sub-server 310 can communicate with the vehicle and implement a function of the sub-server 310, to provide the map update for the vehicle.

Figure 8:
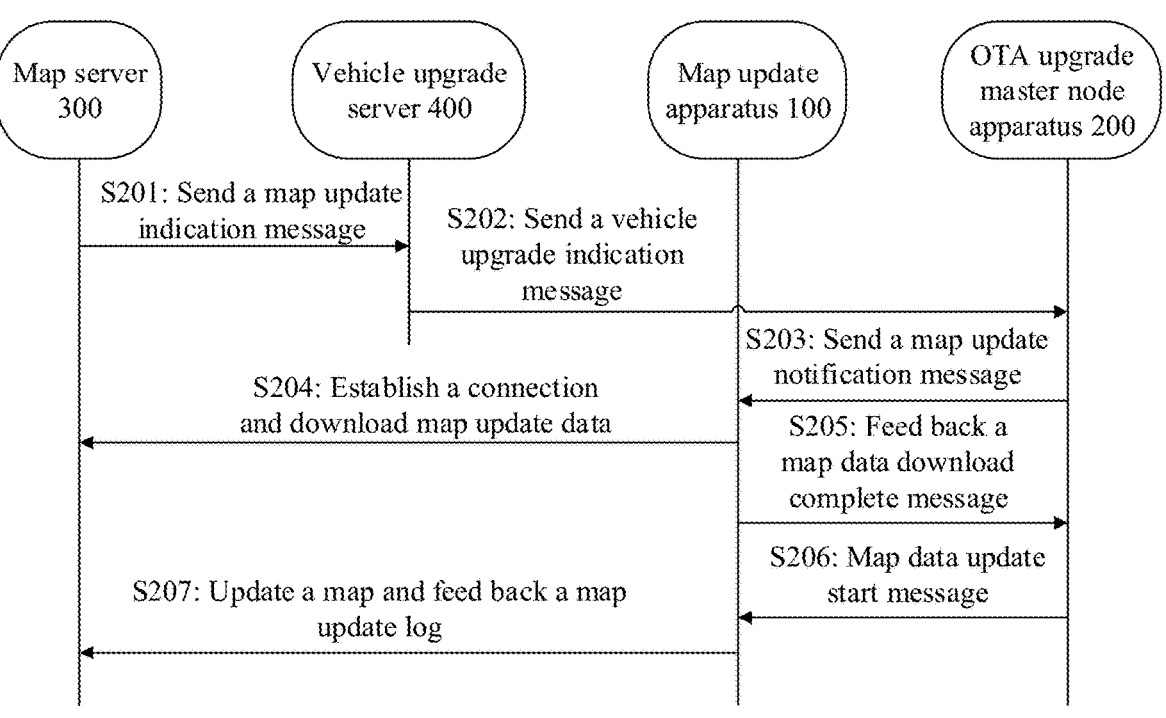
FIG. 8 is a flowchart of another map update method according to an embodiment of this application.

An embodiment of this application further provides a map update method. As shown in FIG. 8, the method includes the following operation S201 to operation S207.

Operation S201: A map server 300 sends a map update indication message to a vehicle upgrade server 400.

In this embodiment, when detecting that stored map data changes, the map server 300 generates map update data and the map update indication message, and sends the map update indication message to the vehicle upgrade server, to add this map update to a vehicle upgrade plan.

Operation S202: The vehicle upgrade server 400 generates a vehicle upgrade indication message based on the map update indication message, and sends the vehicle upgrade indication message to an OTA upgrade master node apparatus 200.

In this embodiment, after receiving the map update indication message, the vehicle upgrade server 400 adds the map update to the vehicle upgrade plan. The vehicle upgrade indication message is generated when software of a vehicle needs to be updated. The vehicle upgrade indication message includes the map update indication message. In some embodiments, the vehicle upgrade indication message may further include at least one of an address of the map server or a download address of the map update data.

Operation S203: The OTA upgrade master node apparatus 200 generates a map update notification message based on the vehicle upgrade indication message, and sends the map update notification message to the map update apparatus 100.

In this embodiment, after receiving the vehicle upgrade indication message, the OTA upgrade master node apparatus 200 generates the map update notification message based on software update progress of the vehicle and the vehicle upgrade indication message. The map update notification message includes related information of a map update task, for example, a version number of the map update data. The map update notification message further includes the at least one of the address of the map server or the download address of the map update data.

Operation S204: The map update apparatus 100 downloads the map update data from the map server 200 based on the map update notification message.

In this embodiment, after receiving the map update notification message, the map update apparatus 100 establishes a connection to the map server, and then sends a map data download start message to the map server 200. The map data download start message is used to trigger the map server 200 to send the map update data to the map update apparatus 100. When the map server 200 sends the map update data, the map update apparatus 100 receives the map update data until data transmission ends.

Operation S205: The map update apparatus 100 sends a map data download complete message to the OTA upgrade master node apparatus.

In this embodiment, after downloading of the map update data ends, the map update apparatus 100 generates the map data download complete message, sends the map data download complete message to the OTA upgrade master node apparatus 200, and then waits to update a map in the vehicle.

Operation S206: After receiving the map data download complete message, the OTA upgrade master node apparatus 200 sends a map data update start message to the map update apparatus 100.

Operation S207: After receiving the map data update start message, the map update apparatus 100 updates the map in the vehicle based on the map update data, generates a map update log of the vehicle after the update ends, and sends the map update log to the map server 300.

In this embodiment, the map update log may include at least one of update time of the map in the vehicle, status information of the vehicle, an update result of the map in the vehicle, or a version number of the map in the vehicle, and the update result includes an update success or an update failure. In addition, the map update apparatus 100 may update the map by using a backup mechanism. When the map update fails, the map update apparatus 100 may roll back the map in the vehicle to an original version, to avoid that an automobile function is unavailable due to an upgrade failure, thereby improving user experience.

Based on the foregoing map update method embodiment, this application further provides a map update apparatus 100. The map update apparatus 100 may be implemented by at least one software apparatus, may be implemented by at least one hardware entity device, or may be implemented by a combination of a software apparatus and a hardware entity device.

Figure 9:
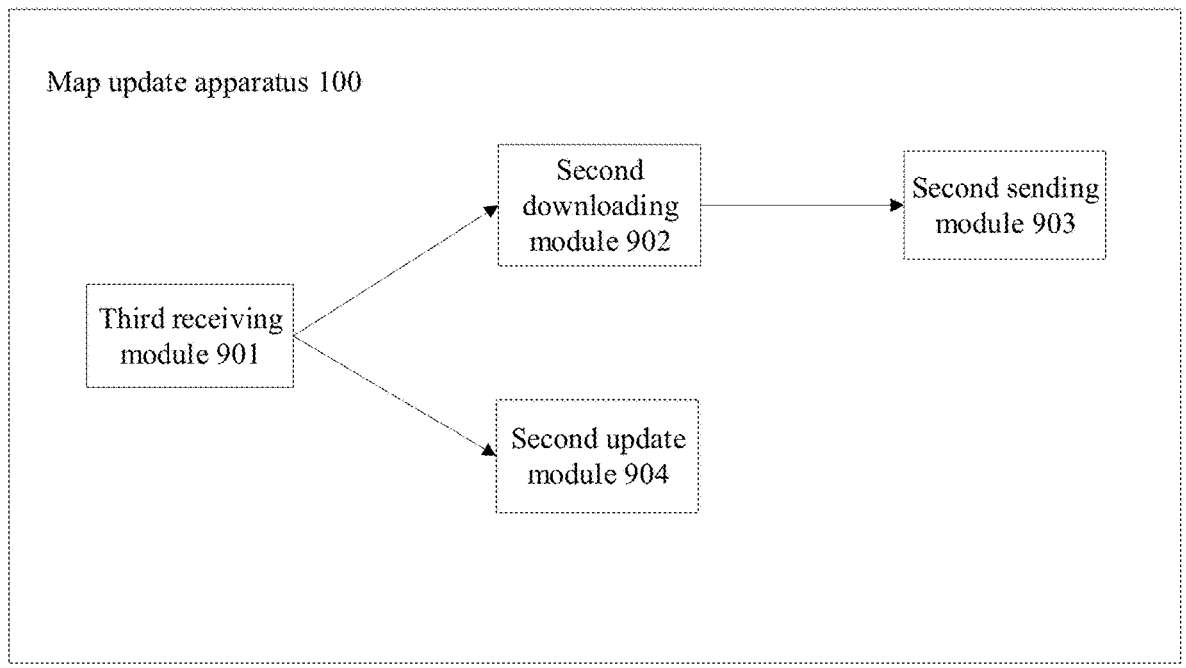
FIG. 9 is a diagram of a structure of another map update apparatus according to an embodiment of this application.

When the map update apparatus 100 is a software apparatus, the map update apparatus 100 may be logically divided into a plurality of modules, each module may have a different function, and the function of each module is implemented by a processor in the map update apparatus by reading and executing instructions in a memory. FIG. 9 is a schematic diagram of a structure of another map update apparatus 100 according to an embodiment of this application. As shown in FIG. 9, the map update apparatus 100 includes a third receiving module 901, a second downloading module 902, a second sending module 903, and a second update module 904. It should be noted that in this embodiment of this application, only example division is performed on the structure and the functional modules of the map update apparatus 100, but division thereof is not limited.

In this embodiment, the third receiving module 901 is configured to receive a map update notification message from an OTA upgrade master node apparatus 200 in a vehicle; the second downloading module 902 is configured to download map update data from a map server 300 based on the map update notification message; the second sending module 903 is configured to send a map data download complete message to the OTA upgrade master node apparatus 200, where the map data download complete message indicates that the map update apparatus 100 has completed downloading of the map update data; the third receiving module 901 is further configured to receive a map data update start message from the OTA upgrade master node apparatus 200; and the second update module is configured to: in response to the map data update start message, update a map in the vehicle by using the downloaded map update data. In addition, the map update apparatus 100 may further include a second log module, configured to: generate a map update log of the vehicle, and send the map update log to at least one of the map server or the OTA upgrade master node apparatus.

The second downloading module 902 is configured to: establish a connection to the map server 300 based on the map update notification message; send a map data download start message to the map server 300, where the map data download start message is used to trigger the map server 300 to send the map update data to the map update apparatus 100; and receive the map update data sent by the map server 300.

When the map update apparatus 100 is a hardware device, the map update apparatus 100 may be any map update apparatus in a vehicle. In a possible implementation, the structure of the map update apparatus may be the structure shown in FIG. 5. Details are not described herein again.

Based on the foregoing map update method embodiment, this application further provides an OTA upgrade master node apparatus 200. Likewise, the OTA upgrade master node apparatus 200 may be implemented by at least one software apparatus, may be implemented by at least one hardware entity device, or may be implemented by a combination of a software apparatus and a hardware entity device.

Figure 10:
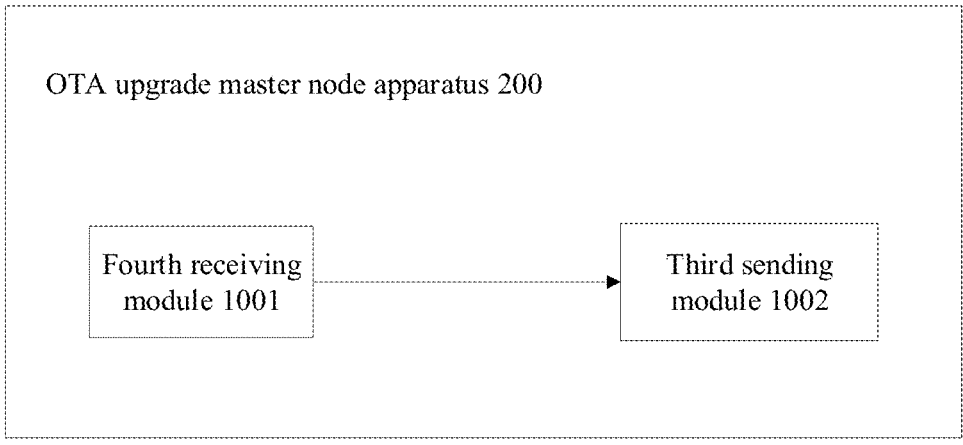
FIG. 10 is a diagram of a functional structure of another OTA upgrade master node apparatus according to an embodiment of this application.

When the OTA upgrade master node apparatus 200 is a software apparatus, a map update apparatus 100 may be logically divided into a plurality of modules, each module may have a different function, and the function of each module is implemented by a processor in the map update apparatus by reading and executing instructions in a memory. FIG. 10 is a schematic diagram of a structure of an OTA upgrade master node apparatus 200 according to an embodiment of this application. As shown in FIG. 10, the OTA upgrade master node apparatus 200 includes a fourth receiving module 1001 and a third sending module 1002. In this embodiment of this application, only example division is performed on the structure and the functional modules of the OTA upgrade master node apparatus 200, but division thereof is not limited.

In this embodiment, the fourth receiving module 1001 is configured to receive a vehicle upgrade indication message from a vehicle upgrade server; the third sending module 1002 is configured to send a map update notification message to the map update apparatus in a vehicle based on map update related information; the fourth receiving module 1001 is further configured to receive a map data download complete message from the map update apparatus; and the third sending module 1002 is further configured to send a map data update start message to the map update apparatus.

When the OTA upgrade master node apparatus 200 is a hardware device, the OTA upgrade master node apparatus 200 may be any map update apparatus in a vehicle. In a possible implementation, the structure of the map update apparatus may be the structure of the map update apparatus shown in FIG. 5. Details are not described herein again.

Figure 11:
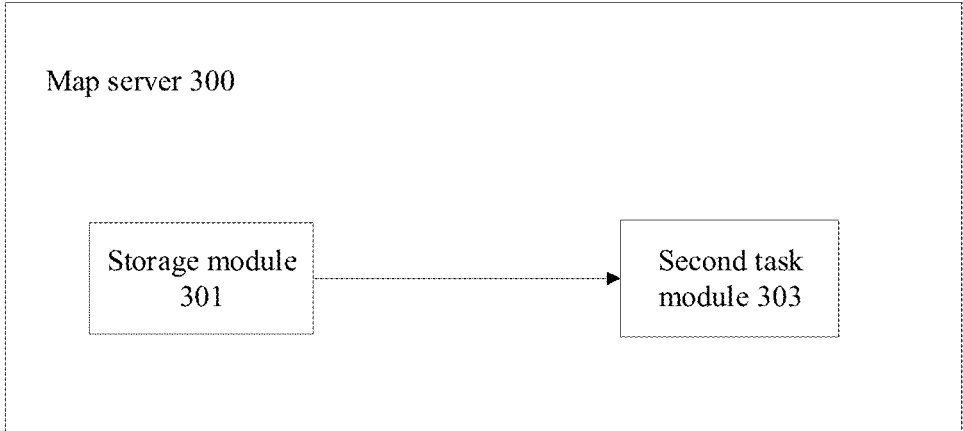
FIG. 11 is a diagram of a functional structure of another map server according to an embodiment of this application.

Based on the foregoing map update method embodiment, an embodiment of this application further provides a map server 300. As shown in FIG. 11, the map server 300 includes a storage module 301 and a second task module 303. The storage module 301 is configured to store map data. The second task module 303 is configured to: determine whether the map data stored in the storage module 301 changes; and when the map data changes, generate a map update indication message, and send the map update indication message to a vehicle upgrade server 400. The second task module 303 is further configured to: when receiving a map data download start message of a vehicle, obtain map update data from the storage module 301, and send the map update data to the vehicle. In some embodiments, the map server 300 may be an independent server that has map data storage and transmission functions. The map server 300 communicates with the vehicle, and provides a map update for the vehicle. Alternatively, the map server 300 may be a set of a plurality of discrete servers that implement map data storage and transmission functions through cooperative work and that are shown in FIG. 7*b*. Functional modules of the map server 300 may be deployed in a plurality of sub-servers 310 in a distributed manner. Each sub-server 310 can communicate with the vehicle and implement a function of the sub-server 310, to provide the map update for the vehicle.

Based on the foregoing map update method embodiment, an embodiment of this application further provides a map update system, configured to update a map in a vehicle.

Figure 12A:
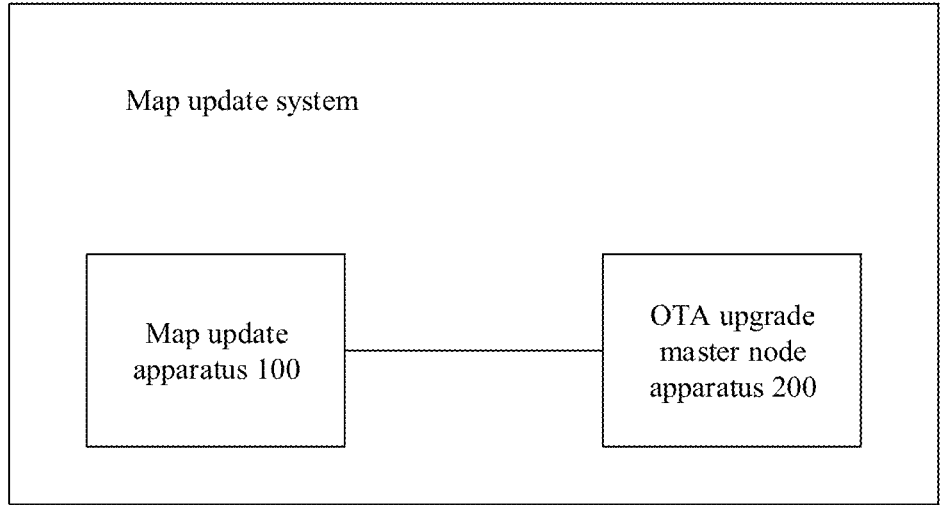
FIG. 12*a* is a diagram of a structure of a map update system according to an embodiment of this application.

In a possible implementation, the map update system may include a map update apparatus 100 and an OTA upgrade master node apparatus 200 that are shown in FIG. 12a. In some embodiments, the map update apparatus 100 may be the map update apparatus 100 shown in FIG. 4, or may be the map update apparatus 100 shown in FIG. 9. The OTA upgrade master node apparatus 200 may be the OTA upgrade master node apparatus 200 shown in FIG. 6, or may be the OTA upgrade master node apparatus 200 shown in FIG. 10.

Figure 12B:
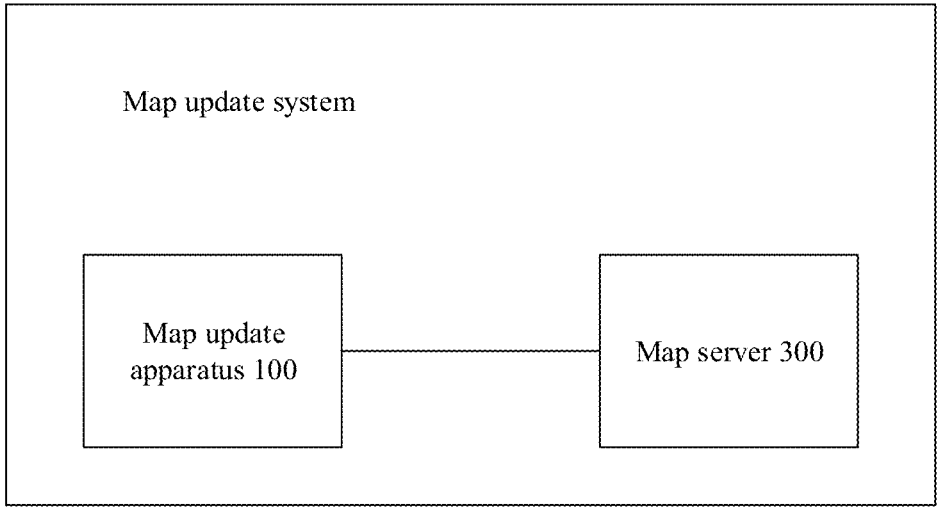
FIG. 12*b* is a diagram of a structure of a map update system according to an embodiment of this application.

In a possible implementation, the map update system may alternatively include a map update apparatus 100 and a map server 300 that are shown in FIG. 12b. In some embodiments, the map update apparatus 100 may be the map update apparatus 100 shown in FIG. 4, or may be the map update apparatus 100 shown in FIG. 9. The map server may be the map server 300 shown in FIG. 7a, or may be the map server 300 shown in FIG. 11.

An embodiment of this application further provides a computer-readable storage medium. The computer-readable storage medium stores computer program code, and when the computer program code is executed by a map update apparatus, the map update apparatus performs the operations in the foregoing map update method embodiment.

An embodiment of this application further provides a computer program product. When the computer program product runs on a map update apparatus, the map update apparatus is enabled to perform the operations in the foregoing map update method embodiment.

It can be understood that the processor in embodiments of this application may be a central processing unit (CPU), or may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, or may be any conventional processor.

The method operations in embodiments of this application may be implemented by using hardware, or may be implemented by the processor by executing software instructions. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be alternatively a component of the processor. The processor and the storage medium may be located in an ASIC.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage vehicle, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It can be understood that various numbers in embodiments of this application are merely used for differentiation for ease of description, but are not intended to limit the scope of embodiments of this application.

What is claimed is:

1. A map update apparatus in a vehicle comprising:
   at least one processor and at least one memory, wherein the at least one memory is to store program instructions, and the at least one processor is coupled to the at least one memory to execute the instructions, which thereby causes the at least one processor to:
   receive a map update indication message from a map server, wherein the map update indication message indicates a map update task;
   send a first map update query request message to an over the air (OTA) upgrade master node apparatus in the vehicle based on the map update indication message, wherein the first map update query request message comprises related information of the map update task;
   receive, at a map update client in the vehicle, a first map update query feedback message that is fed back by the OTA upgrade master node apparatus based on the first map update query request message, wherein the first map update query feedback message comprises status information indicating a status of an intelligent driving function of the vehicle as being disabled and a status of a map in the vehicle as not being used;
   in response to the status information from the OTA upgrade master node apparatus indicating that the intelligent driving function of the vehicle is disabled and the map in the vehicle is not being used, determine, by the map update client, that a map update of the map in the vehicle can be performed, and send, by the map update client, a map data download start message to the map server, wherein the map data download start message is used to trigger the map server to send map update data to the map update apparatus for updating the map in the vehicle;
   receive the map update data sent by the map server; and
   update a map in the vehicle based on the map update data.

2. The apparatus according to claim 1, wherein the at least one processor is further to:

determine, based on the first map update query feedback message, that a map update is capable of being performed in the vehicle.

3. The apparatus according to claim 1, wherein the at least one processor is further to:

generate a map update log of the vehicle, and send the map update log to the map server.

4. A map update apparatus in a vehicle comprising:

at least one processor and at least one memory, wherein the at least one memory stores program instructions, and the at least one processor is coupled to the at least one memory to execute the instructions, which thereby causes the at least one processor to:

receive, by an over the air processing node of the vehicle executed by the at least one processor, a first map update query request message from a map update apparatus in the vehicle, wherein the first map update query request message comprises related information of a map update task; and send, by the over the air processing node of the vehicle executed by the at least one processor, a first map update query feedback message to the map update apparatus in the vehicle based on the first map update query request message, wherein the first map update query feedback message comprises status information of the vehicle indicating a status of an intelligent driving function of the vehicle as being disabled and a status of the map in the vehicle as not being used, and the first map update query feedback message causes the map update apparatus to perform a map update of the map in the vehicle in response to the status information in the first map update query feedback message indicating that the intelligent driving function of the vehicle is disabled and the map in the vehicle is not being used.

5. The apparatus according to claim 4, wherein the at least one processor is further to:

send a second map update query request message to a user;

receive a second map update query feedback message fed back by the user; and generate the first map update query feedback message based on the second map update query feedback message.

6. The apparatus according to claim 4, wherein the at least one processor is further to:

send a third map update query request message to a vehicle upgrade server;

receive a third map update query feedback message fed back by the vehicle upgrade server; and generate the first map update query feedback message based on the third map update query feedback message.

7. A map update apparatus in a vehicle comprising:

at least one processor and at least one memory, wherein the at least one memory stores program instructions, and the at least one processor is coupled to the at least one memory to execute the instructions, which thereby causes the at least one processor to:

receive a map update notification message from an over the air (OTA) upgrade master node apparatus in the vehicle;

download map update data from a map server based on the map update notification message;

send a map data download complete message to the OTA upgrade master node apparatus, wherein the map data download complete message indicates that the map update apparatus has completed downloading of the map update data;

receive a map data update start message, based on a status information of the vehicle, from the OTA upgrade master node apparatus, wherein the status information of the vehicle comprises a status of an intelligent driving function of the vehicle being disabled and a status of the map in the vehicle not being used; and update a map in the vehicle by using the downloaded map update data, in response to that status information and the map data update start message.

8. The apparatus according to claim 7, wherein the at least one processor is further to:

establish a connection to the map server based on the map update notification message;

send a map data download start message to the map server, wherein the map data download start message is used to trigger the map server to send the map update data to the map update apparatus; and receive the map update data sent by the map server.

9. The apparatus according to claim 7, wherein the map update notification message comprises an address of the map server or a download address of the map update data.

10. The apparatus according to claim 7, wherein the at least one processor is further to:

generate a map update log of the vehicle, and sending the map update log to at least one of the map server or the OTA upgrade master node apparatus.

* * * * *